Oct. 19, 1937.  A. K. WATT  2,096,151
CLUTCH PEDAL RETURN SPRING
Filed Aug. 8, 1936  2 Sheets—Sheet 1

Inventor
Andrew K. Watt
By Blackmore, Sever & Hunt
Attorneys

Oct. 19, 1937.  A. K. WATT  2,096,151
CLUTCH PEDAL RETURN SPRING
Filed Aug. 8, 1936   2 Sheets-Sheet 2

Inventor
Andrew K. Watt
By Blackmore, Spence & Flint
Attorneys

Patented Oct. 19, 1937

2,096,151

UNITED STATES PATENT OFFICE 2,096,151

CLUTCH PEDAL RETURN SPRING

Andrew K. Watt, Lansing, Mich., assignor to General Motors Corporation, Detroit, Mich., a corporation of Delaware Application August 8, 1936, Serial No. 94,945

2 Claims. (Cl. 192—99)

This invention relates to a pedal for the operation of the clutch of a motor vehicle and more particularly to the return spring therefor.

An object is to provide a clutch pedal with a return spring arranged to operate in a reverse direction and aid in pedal depression after the initial movement of the latter.

Other objects include efficiency, simplicity and economy in the attainment of the major object.

Figure 1:
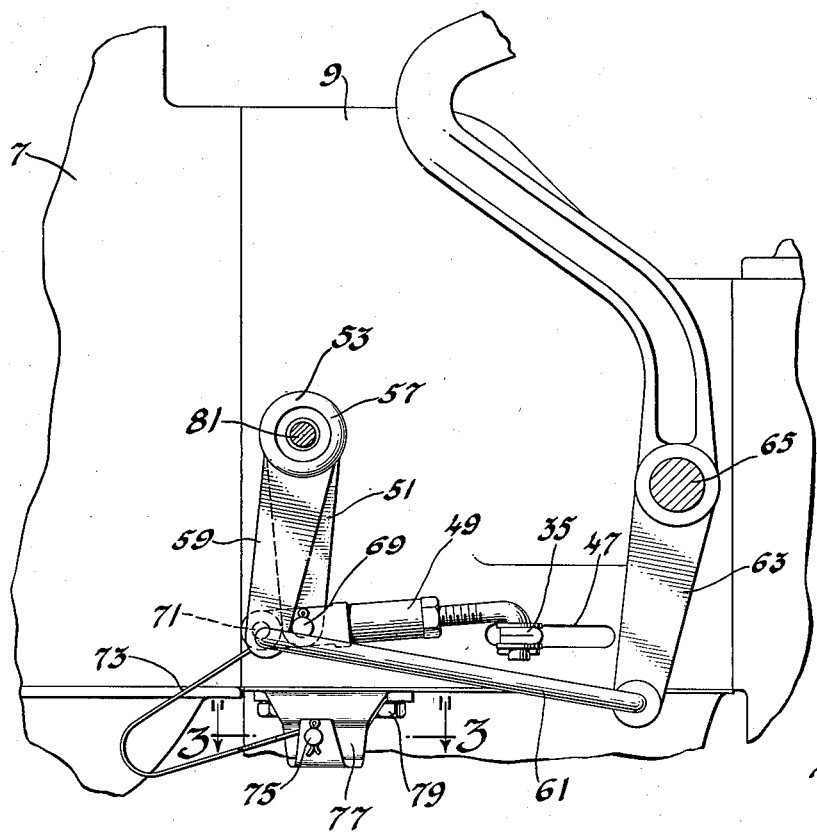
Fig. 1 is a view in side elevation of the clutch pedal and the parts associated therewith acting to release the vehicle clutch.
Figure 3:
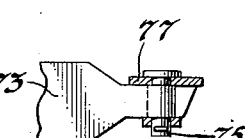
Fig. 3 is a section as seen from line 3—3 of Fig. 1.

Referring by reference characters to the drawings, there is shown at the rear of the engine marked 7 a clutch housing 9. Within housing 9 may be seen such conventional parts as the toothed ring 11 of the flywheel, driven shaft 13, driven plate 15 and pressure plate 17. An abutment plate 19 is secured to the flywheel in any preferred way. Springs, one shown at 21, seat on plate 19 and push the pressure plate into operative position. The pressure plate extends through an opening 23 in the abutment plate and thus rotates with the flywheel. The abutment plate carries pins such as 25 formed with trunnions 27. The ends of pin 25 are reciprocable in bored out guide openings 29 in the pressure plate. There are a plurality of the trunnion carrying pins distributed about the plate 19. On each trunnion is pivoted a finger 31. The inner ends of the fingers engage a disc 33, the latter adapted to be moved forwardly, to the left in the figure, and to thereby rotate the finger shown in Figure 4 counterclockwise. To so move the disc 33, a lever 35 is pivoted at 37 on a fulcrum device 39 carried by the housing 9 and at its inner end it engages trunnions 41 on a collar 43 carrying a block 45 of antifriction composition. The block 45 is positioned to contact the disc 33. The ends of the fingers engage the pressure plate. When the lever 35 is actuated in a counterclockwise direction, it moves the pressure plate against the compression of springs 21 and releases the clutch.

The lever 35 which may be called the throwout lever extends through an opening 47 in casing 9. At its outer end it is connected by a link 49 to the lower end of an arm 51 depending from a tubular rock shaft 53. This rock shaft has a ball joint support as at 55 with the casing 9 at one end and is similarly supported from the chassis frame at the other end 57. At that other end is an arm 59 connected by a link 61 to the lower end of a clutch release pedal 63. The pedal is pivoted on a pivot pin 65 carried by the chassis frame 67.

Link 49 may be made adjustable in length if desired and as shown. It extends somewhat beyond its pivotal connection 69 with arm 51. At its extreme end it is pivoted to the eye 71 on the end of one leg of a U-shaped spring 73. The other leg of the spring is pivoted on a pin 75 carried by a bracket 77 secured to the clutch housing at 79.

Figure 2:
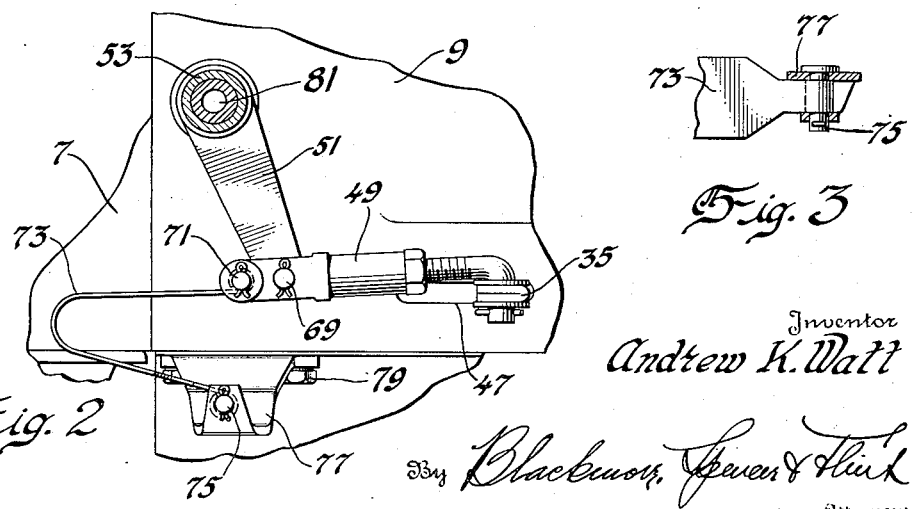
Fig. 2 is a side elevation of parts shown in Fig. 1 but displaced from the relative position therein shown.

It will be observed that pivot 71 in Fig. 1 is to the left of a line joining pivot 75 and the axis of rotation 81 of the arm 51, while in Fig. 2 pivot 71 is to the right of this line. Fig. 1 shows the relative positions of the parts when the pedal 63 is released and the clutch engaged by its springs 21. Under these conditions the U spring is under stress and its ends tend to spread apart. Since the end at 75 is fixed, the other end tends to separate therefrom and to pull rod 61 and rock the pedal 63 to its limiting idle position. If the pedal is depressed, rod 61 is pulled and with it pivot 71. Spring 73 is further compressed as pivot 71 is brought into the line joining pivots 81 and 75. The manual effort in depressing the pedal is resisted by this spring compression. Upon the exertion of further manual effort, the pivot 71 passes to the opposite side of the aforesaid line as shown by Fig. 2. The energy stored in the spring in reaching the said line is then released to assist the operator in depressing the pedal because in expanding it tends to rock arm 51 counterclockwise and thus pushes upon arm 49.

By the above expedient a very simple spring located as shown normally holds the pedal in its idle position, offers a slight resistance to the first part of the pedal depression but, by reversing its action on the pedal as it passes through the line of centers, very materially assists the operator by reducing the manual effort required to further depress the pedal and release the clutch.

Figures 4, 5:
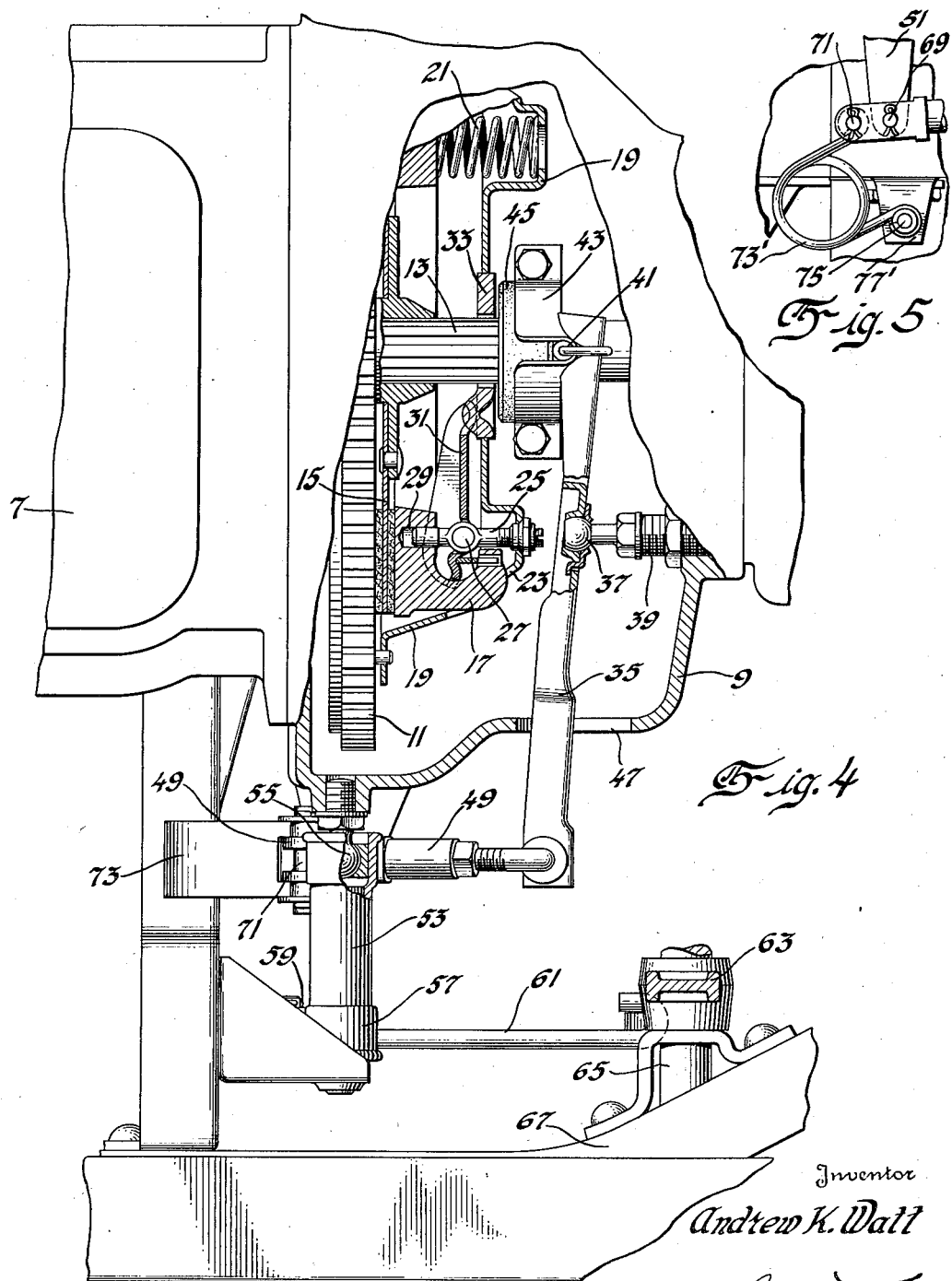
Fig. 4 is a plan view, partly broken away and in section.
Fig. 5 shows in side elevation a modified form.

In Fig. 5, I have shown an embodiment of the invention using a modified form of spring—a spring 73' made of material circular in cross section and shaped as shown. The spring ends are attached at 71 to the end of link 49 and to a bracket 77' the latter corresponding to bracket 77. This embodiment of the invention operates in the same way as the one employing the flat spring 73. Obviously springs of other cross sectional shapes may be used in place of springs 73 and 73'.

I claim:

1. In combination with a clutch, a throwout lever, a pedal, a rock shaft, arms on said rock shaft, links pivoted to said arms and to said throwout lever and pedal, one of said links extending beyond its pivoted connection with its arm, a spring having legs, one of said legs having a fixed anchorage, the other leg connected to said link extension, whereby when said pedal is depressed the link extension moves across a line joining the fixed anchorage and the axis of the rock shaft.

2. In combination, a manually operable lever, a clutch having a part movable to effect clutch release, operating connections between said lever and part, said connections including a rock shaft with an arm, a U-shaped spring having legs, one leg having a fixed anchorage and means to secure the other leg to said arm, the end of said other leg movable in the act of clutch release from one side to the other of a line joining said fixed anchorage to the axis of said shaft and thereby operable both to hold the lever in idle position and to supplement the manual effort applied to the lever in the act of clutch release.

ANDREW K. WATT.